INVENTOR
ARTHUR C. JOHNSON
BY Seidel & Gonda
ATTORNEYS.

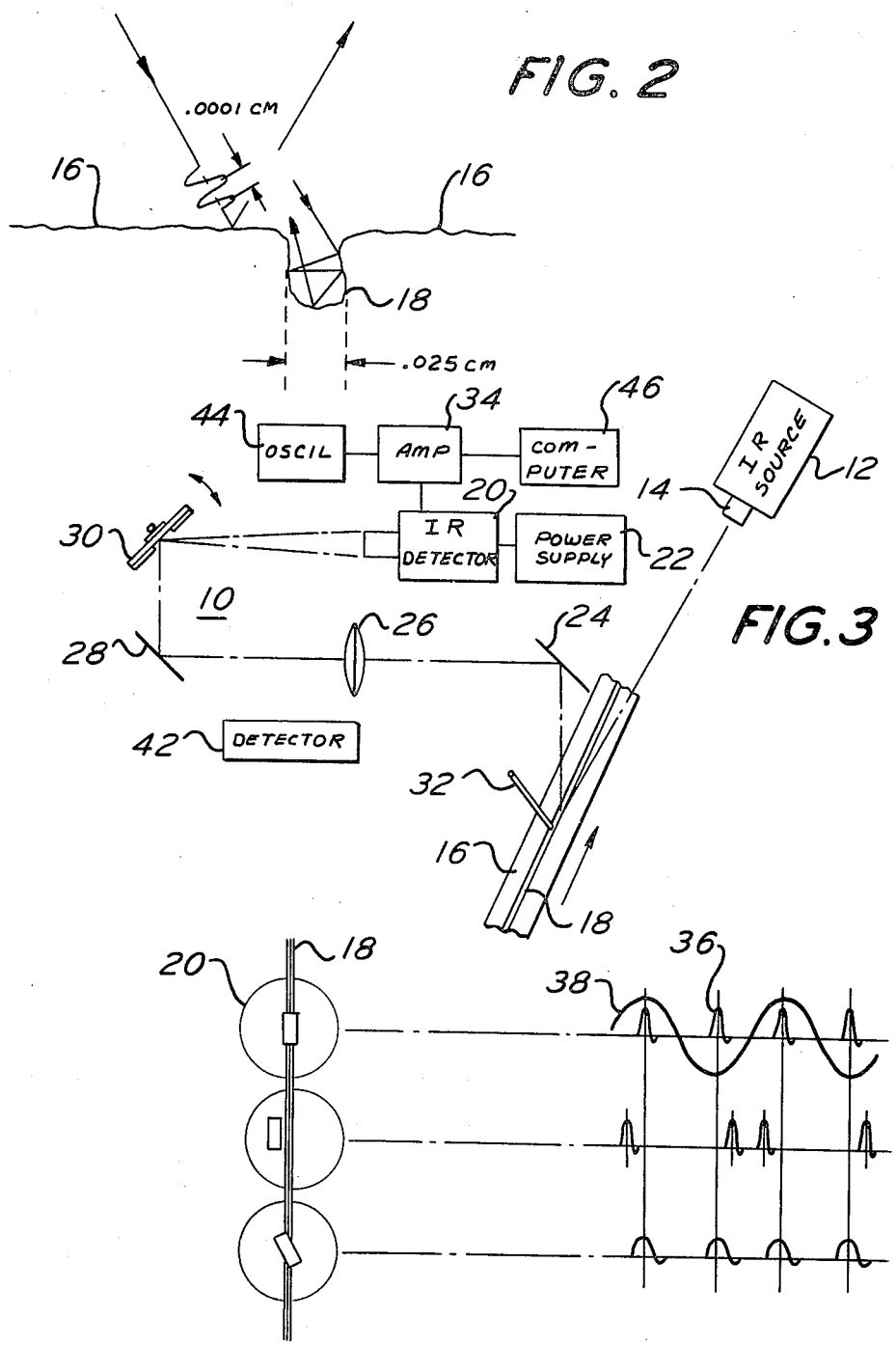

United States Patent Office 3,511,965
Patented May 12, 1970

3,511,965
POSITIONING AND TRACKING APPARATUS FOR WORK TOOLS
Arthur C. Johnson, Cinnaminson, N.J., assignor to Inductotherm Corporation, Rancocas, N.J., a corporation of New Jersey
Filed Jan. 25, 1968, Ser. No. 700,553
Int. Cl. B23k 9/12; G05b 1/06
U.S. Cl. 219—125                                   6 Claims

ABSTRACT OF THE DISCLOSURE

A weld seam positioning and tracking apparatus having a source of infra-red radiation in the wavelength range of 1 to 10 microns directed on the weld seam and areas adjacent thereto, a detector for receiving and transducing reflected infra-red radiation, scanning apparatus for scanning the detector relative to the weld seam whereby said detector produces a time pulse variation indicative whether the reflected radiation is received from the weld seam or the area adjacent thereto, and output apparatus relating the pulse created by the weld seam cavity to the scan width as an indication of the position of the detector relative to the weld seam.

---

This invention relates to positioning and tracking apparatus for work tools. More particularly, this invention relates to the positioning and tracking apparatus for a welding instrument that is to follow and weld a seam.

The present invention is described in terms of an apparatus for positioning an arc welding head with respect to a seam to be welded. However, those skilled in the art will readily recognize that the apparatus has greater utility in that it may be used to position any number of tool elements with respect to a cavity formed by a depression or opening in a surface. The present invention provides a weld seam tracking apparatus that is capable of positioning the weld electrode with a high degree of precision and maintaining such position as the electrode is displaced relative to the work piece being welded.

There are many types of apparatus which track weld seams with varying degrees of success. There are devices which use optical scanning methods to follow the weld seam such as represented by U.S. Patents 3,004,166, 3,005,901, 3,124,691 and 3,135,857. Such devices use electromagnetic radiation in the visible portion of the spectrum. The difficulty encountered with such devices is that electromagnetic radiation at the visible portion of the spectrum is not highly reflective from a good many materials which must be welded. In addition, the interference created by smoke and soot is a great hinderance to the operation of the apparatus creating errors.

Another common type of weld seam tracking apparatus uses magnetic detectors such as disclosed in U.S. Patents 2,921,179, 3,017,496, 3,076,889, 3,268,805 and others. Sometimes the weld seam tracking apparatus uses an electric field type of detector such as in U.S. Patent 3,133,186. While effective to a degree, weld seam tracking apparatus using either magnetic or electric field detectors suffer from the disadvantage of having to separate the relevant signals from a sea of noise. In addition, the detectors must make physical contact with the work piece which can be extremely cumbersome to accomplish with odd shaped weldments and where the work piece must be clamped close to the seam in order to control stresses, distortions and the quality of the weld. Still another disadvantage is that the magnetic and electrical devices can only be used for metals.

The present invention seeks to provide a new and unobvious positioning and tracking apparatus primarily for welding which is not susceptible to the disadvantages of the prior devices as set forth above. The present invention takes advantage of the general principle that a cavity may be either a highly absorbent or a highly efficient radiator of electromagnetic energy. It should be understood that as used throughout this disclosure and in the claims, the word "cavity" includes physical means which may simulate the existence of a cavity such as, for example, a layer of gold-black or pencil carbon which are highly absorbent at certain wavelengths. Since a weld seam is the physical equivalent of a cavity, it can be used to absorb or radiate electromagnetic energy at a different intensity than the surface areas surrounding it. It therefore follows that be detecting the change in intensity created by the weld seam cavity, and relating this change in intensity to the spacial distances between the cavity and the detector, an effective means for positioning the working tool is provided.

As a further part of the present invention, it has been found that the use of electromagnetic radiation from the infra-red portion of the spectrum, particularly from the near infra-red portion, greatly enhances the sensitivity and selectivity of the entire apparatus. The near infra-red region of the electromagnetic spectrum includes radiation having a wavelength from 0.0001 to 0.001 centimeter (1 to 10 microns). Electromagnetic radiation having a wavelength of 1 to 10 microns is particularly advantageous when used for the purposes of the present invention which primarily include weld seam positioning and tracking. Upon analysis, the reasons for using radiation having a wavelength of 1 to 10 microns are as follows:

(A) The wavelength of radiation in this range is large compared to the atomic spacings in most metallic and, in fact, most other common materials. Accordingly, all of these materials are highly reflective of the radiation. This even includes materials which appear black to the visible eye but are not necessarily "black" to radiation in the near infra-red frequencies where they often are highly reflective.

(B) The machine fitting of parts to anything within the 1 to 10 micron range requires extremely high quality fabricating technique. Thus, ordinary commercial fits of even high quality weldments present relatively large cavities to wavelengths in the near infra-red region of the spectrum.

(C) The number of fitted elements which will provide the requisite cavity is quite large. Thus, even a scribed line fulfills the dimensional requirements of the cavity as could a highly absorbent coating.

(D) Ordinary surface irregularities including minute scratches, oxides and the like are small or at least of the same order of magnitude as the near infra-red radiation wavelength and are generally randomly distributed. The apparatus is therefore relatively insensitive to the more general types of surface irregularities.

(E) The apparatus is in no way effected by the magnetic properties of the weldment, nor is it dependent on electrical properties such as conductivity or dielectric coefficient, although the absorption coefficient of materials may be closely related to these properties. However, within the range of wavelengths specified herein, only a few very special materials exhibit ionic resonant frequencies, or lattice structures, which make them transparent or highly absorptive to these frequencies. Moreover, such resonances are usually so sharply defined that they effect only a relatively small portion of the banded frequencies being used.

(F) Radiation at the specified wavelengths is easily and inexpensively generated at high power levels; that is in hundreds of watts.

(G) Detectors are commercially available so there is no requirement for developing new devices for use in constructing the apparatus.

(H) Extraneous radiation from an arc or other source within a width of 1 to 10 microns does not produce detrimental noise, but instead supplements the source of radiation providing the basic energy for reflection onto the detector from the surface of the weldment and the cavity defined by them.

It therefore is an object of the present invention to provide apparatus for positioning and tracking relative to a cavity, particularly a weld seam cavity having the following advantages:

The apparatus is capable of ascertaining the location of the cavity (seam) with a high degree of precision relative to the requirements of arc welding processes.

The apparatus can follow abutted or lapped seams, T joints, or weld-through joints where no physical seam exists on the side presented to the welding apparatus.

The apparatus can weld over tack welds without loss of positioning control.

The apparatus can be operated without bringing it into physical contact with the work pieces nor need it be in close proximity to them. This provides freedom to clamp the work pieces close to the joint and permits the apparatus to weld in close proximity to the bosses or attachments close to the work area.

A constant or nearly constant weld carriage speed can be used to maintain constant weld speed. This is possible in spite of the wide variations in positioning velocity which may in some cases even require reverse motion.

All delicate instrumentation including optics and electronic equipment can be kept well away from the welding arc to avoid damage from heat or spatter.

The basic signal information is clearly defined and not submerged in a sea of surrounding noise from which it would have to be extracted.

The signal information has a precise and well defined relationship with respect to what it is attempting to define. Thus, the time displacement of sharply defined pulses is used for control purposes so that the apparatus is not sensitive to variations in material quality or surface condition.

The apparatus performs its function on a wide variety of metallic and non-metallic surfaces and is responsive to a wide variety of cavities.

For the purpose of illustrating the invention, there is shown in the drawings a form which is presently preferred; it being understood, however, that this invention is not limited to the precise arrangements and instrumentalities shown.

FIG. 2 is a highly enlarged schematic diagram illustrating the absorption of infra-red radiation by a cavity.

FIG. 3 is a schematic diagram of a positioning and tracking apparatus which may be used in accordance with the present invention.

FIG. 4 is a diagram illustrating the response of the detector when aligned with or displaced from a weld seam.

Referring now to the drawings in detail, wherein like numerals indicate like elements, there is shown in FIG. 3, a cavity positioning and sensing apparatus designated generally as 10.

Figure 1:
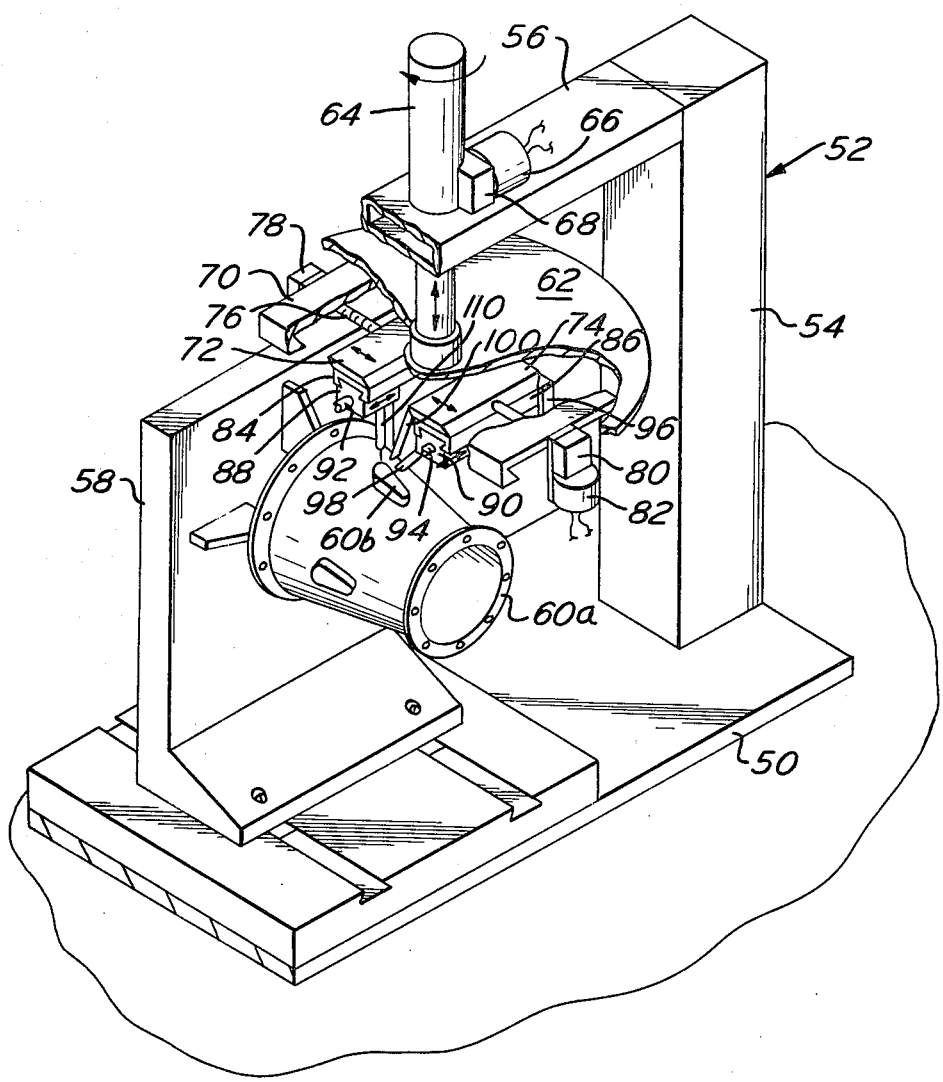
FIG. 1 is a perspective view of a carriage and turret head for supporting the detector and welding appaartus.

As shown in FIG. 3, a source of infra-red radiation 12 including appropriate lenses or other wave guide means 14 directs the radiation at the work pieces 16 which in this case may be two pieces of metal which are to be butt welded. The seam between the two pieces 16 is designated by the numeral 18 which is schematically shown in cross section in FIG. 2.

As best shown in FIG. 2, the incident radiation from the source 12 strikes the weldment 16 and is reflected therefrom. This radiation may be created by a pair of hot wires connected to an electric source or a heated cavity. In any case, energy delivered from the source is concentrated in the 1 to 10 micron region which is generated at a color temperature of approximately 500 to 2000° K. The incident wave in FIG. 2 is conveniently indicated as being .0001 cm. or 1 micron. In accordance with conventional principles of optics, the angle of incidence is equal to the angle of reflection assuming a good reflective surface. However, when the incident wave strikes the cavity, multiple reflections result in a high degree of absorption. For example, a surface having a reflectivity of .9, which is high, absorbs 44% of the energy after only five reflections. In addition, any energy which is reflected out of the cavity is spread over a wide angle, thus further reducing its intensity. Thus, any detector positioned at the angle of reflection will record a sharp dropoff in the intensity of the reflected wave as it scans across the cavity 18.

An infra-red detector 20 with an appropriate power supply 22 is positioned to receive reflected infra-red radiation from the source 12 by means of an appropriate optical system. Such optical system may include the mirror 24 positioned to reflect radiation received directly from the weldments 16 through a focusing lens 26 onto another mirror 28. Mirror 28 reflects the radiation onto a scanning mirror 30 which scans the image of the seam 18 across the infra-red detector 20.

The type of infra-red detector 20 used depends upon the spectral region which the apparatus is to operate. It has been found that a lead sulfide crystal makes an effective detector which can be operated at room temperature. The sensitivity of a lead sulfide detector, particularly at the longer wavelength, can be improved by an order of magnitude of 1 or 2 by keeping the lead sulfide at the temperature of liquid nitrogen which is 77° K. However, the characteristics of the system are quite satisfactory for most purposes without the necessity of refrigeration. Or if desired, Bolometers, photovoltaic, photoelectromagnetic, photoemissive, and other devices capable of detecting infra-red radiation in the 1 to 10 micron region can be used.

It has been found that by using an irradiation of 1 micro-watt/cm.$^2$, a signal in the order of 100 microvolts can be produced using only a 1 volt bias across the detector and an impedance matching resistor. The work area examined to produce this output is approximately .25 x 2.5 mm. or about 6.25 x 10$^{-3}$ cm.$^2$ which was imaged onto a lead sulfide detector of the same size. By raising the intensity to 1 watt/cm.$^2$, a signal of about 0.6 microvolt can be produced. If desired, even higher irradiances of 100 watts/cm.$^2$ and bias voltages of 10–20 volts are practical. Thus, relatively high detection signals which require only modest amplification can be produced in the system.

A scanning system is provided for creating the effect of relative movement between radiation and the seam 18. In the illustrated embodiment, the scanning mirror 30 changes the angle of incidence of the reflected radiation on the detector 20, thus giving the effect that the view of the detector moves from side to side across the seam 18. The mirror 30 is made non-reflective with respect to the infra-red radiation except at the narrow slit portion which is approximately the size of the largest seam intended to be detected by the apparatus 10. Using radiation in the near infra-red, the largest effective size of seam which can be tracked is 0.508 cm. This therefore should be the image size which is reflected by the mirror 30 of the detector 20. Thus, the mirror 30 permits the infra-red detector to see one side of the weldment 16, then the seam 18, then the opposite side.

The work element, which in this case is the welding electrode 32, is positioned behind the scan portion of the seam. This means that any portion of the weld seam 18 is scanned before the work element arrives at the same portion. This is illustrated by the arrowhead next to the weldment 16 indicating the direction of travel of the detector 20 and welding electrode 32.

The magnitude, velocity, frequency and form of the scanning sweep motion can be varied as required by the size and geometry of the work and the responsiveness of the detector 20 and its associated electronic equipment. Satisfactory results have been attained sensing scribe or pencil lines on various metals, paper, plastic with a cavity or simulated cavity of .00254 to .0254 cm. using a sinusoidal sweep motion scanning approximately .318 cm. on each side of the seam 18 in a frequency of 60 cycles per second. Experience shows that the output of the lead sulfide detector 20 has a pulse wave form roughly equivalent to that of ½ cycle of a thousand cycle per second cycle signal. The pulse is created each time the detector scans across the seam 18 thereby resulting in a drop in intensity. This is in effect a negative pulse but it may be displayed as a positive pulse in any electronic equipment by simply inverting the same.

Of course, the characteristics of the pulse signal are determined by the time response characteristics of the detector and its associated amplifiers 34. By selecting the time response characteristics so as to permit the entire detector to recover in about ¼ of the sweep period, a relatively steep pulse can be generated when the scan leaves the edge of the weldment 16 and moves over the cavity created by seam 18.

The diagram of FIG. 4 illustrates one manner in which a relative position of the seam 18 with respect to the detector 20 can be measured. The lefthand portion of FIG. 4 shows the seam 18 having a width of approximately .0508 superimposed over the entrance window of the infra-red detector 20. The square box in the middle of the detector represents the image area as it is scanned across the detector. The righthand portion of the diagram illustrated in FIG. 4 shows the output of amplifier 34 as it would be displayed on an oscilloscope simultaneously with a 60 cycle sinusoidal wave synchronized to the scan of mirror 30. In the topmost part of the diagram in FIG. 4, the seam 18 is represented as precisely centered on the detector 20. Accordingly, a sharp pulse 36 appears each half cycle of the reference 60 cycle scan wave 38. The time relation between the pulses 36 of the scan 38 is such that the pulses appear exactly 180° apart and at the peak amplitude of each half cycle of the scan wave. Thus, visual observation would indicate that the detector 20 and seam 18 are aligned.

The middle portion of the diagram in FIG. 4 illustrates what occurs when the seam 18 and detector 20 are not aligned. In this instance, the phase relationship between the pulses 36 and the scan wave 38 is changed. Moreover, the pulses themselves are not equally spaced throughout any 360° of the scan wave. This is because the mirror 28 will scan the seam 18 twice in ½ cycle and not at all in the next ½ cycle depending upon which way the seam 18 is shifted out of alignment.

The lower portion of FIG. 4 shows how the line of motion of the detector relative to the seam 18 can be determined. If the line of motion of the detector relative to the seam 18 is not coincident, then the image will be rotated at an angle as illustrated in the lowermost part of FIG. 4. This can be exercised by scanning an area which is relatively narrow with respect to its length. Thus, when rotated in relation to the seam 18, the rate of energy change seen by the detector effects the pulse amplitude.

Another method for positioning the line of motion of the detector 20 with respect to the seam involves the use of a second detector and scanning system 42 which is shown schematically since it is the same construction as the detector scanning system previously described. The second detector and scanning system 42 duplicates that of the first but at a different position along the seam 18. Accordingly, the alignment of the apparatus can be interpreted.

Other than using the time relationship between the pulses 36 and the scanning wave 38, it is also possible to determine the amount by which the detector 20 and seam 18 are out of line by examining the magnitude of the pulse 36. As the seam 18 moves out of alignment with the detector 20 and the pulse spacing varies, the amplitude of the pulse is also reduced due to two factors. First, the scan velocity is less at the time the edge of the cavity is encountered, and second the amplitude is further reduced by the time constant characteristics of the detector 20 and amplifier 34. Since amplifier 34 is preferably a tuned amplifier, the velocity change results in a change of pulse width and an effective change of frequency which reduces the amplifier gain. Thus, calibration of the amplitude of pulse 36 can provide a means for measuring the degree of misalignment.

Referring now to FIG. 1, there is shown a machine for supporting the detector and work element which in this case is a welding electrode. The machine includes a base 50 upon which is fixed a turret support structure 52 that includes a pair of upright standards 54, of which only one is shown, and a cross member 56 to which the turret is fixed. A fixture 58 is adjustably supported in position on the base 50 and retains the weldments 60a and 60b which are previously clamped or tack welded in position.

The turret 62 is fixed to the post 64 which may be reciprocated along its longitudinal axis or rotated thereabout by the servomotor 66 and drive mechanism 68.

The turret 62 supports a longitudinal carriage support plate 70 which slidably supports a longitudinal carriages 72 and 74 in a dovetail type fit. A screw 76 is suitably mounted in bearings 78 and 80 which are fixed to both ends of the longitudinal carriage support plate 70. The screw 76 extends through the longitudinal carriages 72 and 74 and threadedly engages them. Thus, rotation of the screw 76 forces longitudinal movement of the carriages 72 and 74 along the axis of screw 76 and supported on longitudinal carriage support plate 70. The screw 76 is rotatably driven by the servomotor 82.

The longitudinal carriage 72 supports a transverse carriage support plate 84 and the longitudinal carriage 74 supports a similar transverse carriage support plate 86. Transverse carriages 88 and 90 are slidably supported on the transverse carriage support plates 84 and 86, respectively. The means of slidable support is a dovetail as shown. Threaded screws 92 and 94 extend through and slidably engage the transverse carriage 88 and 90. The ends of each screw are fixed in appropriate bearing 96 and rotatably driven by servomotors (not shown). Rotation of the screws 92 and 94 by their respective servomotors causes the carriages 88 and 90 to slide in a direction transverse to the longitudinal axis of the longitudinal carriage support plate 70.

The transverse carriage 90 supports the detector 20 and its associated optics which are shown only by their casing 98. The infra-red source of radiation 12 may also be supported on the carriage 90 as indicated by the casing 100. Alternatively, it may be independently supported. The arc welding apparatus 110 or other tool element is supported on the carriage 88 by any conventional means.

If desired, the screw 76 may be divided into two sections and independently driven for creating independent longitudinal motion of the carriages 72 and 74.

From the foregoing, it should be apparent that the support structure 52, turret 62 and associated carriages provide a means for supporting and aligning the tool element and tracking apparatus. Appropriate drive motor such as servomotor 66 and 82 can be used to continuously maintain alignment during the working operation which in the disclosed embodiment is the welding of weldment 60b to weldment 60a.

In operation, the weldments 60a and 60b are positioned on their fixture and then the welding head 110, source 100 and detector are aligned. Alignment may be accomplished by making manual adjustments while scanning the weld seam until the pulse is appropriately positioned with respect to the scan wave which is synchronized to the scan mirror. Thereafter, the servomotor 82 is energized and the screw 76 rotated at a constant speed corresponding to the desired weld speed. The drive speed for the motor 82 is adjustable in accordance with the type of weld being made. During this entire time, the detector 20 scans the seam a short distance ahead of the weld and indicates whether or not the alignment is being maintained. The alignment can be checked by observing the display upon oscilloscope 44. Correction is accomplished by energizing the appropriate motor for the appropriate length of time.

For more sophisticated operations, a memory system or process control computer may be used. These items will not be necessary if the curvature is not so severe that the slight distance by which the detector leads the weld electrode becomes a problem. Normally, a misalignment of 5° can be tolerated without any problem. When the rate of change of direction is severe or completely unpredictable, a process control computer 46 can determine the degree of correction required and deliver this information to the servomotors which will reposition carriage 88 and the work element. The process control computer can use two sets of signals as derived from detectors 20 and 42 or it can, as explained above, analyze the pulse on the basis of both its time spacing and amplitude to determine the degree of correction required.

In addition, a conventional memory system can be added to the computer 46 to store the pulses in order to compensate for the time elapsed while the work element 110 moves to the position being scanned by the sensing head 20.

Although there are conventional memory storage systems available for storing and then relaying the information to the work element when required, the following novel system may be used where freedom to position the detector in relation to the work element is desired. Such a system would include a cathode ray scan conversion tube such as is commonly used in radar to convert polar projection input to television raster images can be used to store the pulse positions relative to the scanning system and read them out at a preset later time. As is known, these cathode ray tubes consist of two cathode ray beams with independent sweep controls. The first beam is used to "write" and the second beam is used to "read" from a common storage screen. By timing the cathode ray beams to operate at one sweep per path of the scanning head (which in disclosed embodiment is 120 per second) and therefore storing one pulse per sweep, it is possible to delay the output by as much as two seconds. Such a cathode ray tube would constitute the computer 46. Another advantage of such a cathode ray tube is that the scan wave synchronized to the mirror 30 can be added to the screen to provide the necessary manual control function for visual observation and subsequent operation of the servomotors to preposition the system.

A machine constructed in accordance with the present invention for use in positioning and tracking relative to a weld seam has been found to track to the center of a seam with a degree of accuracy equal to plus or minus .013 cm. The apparatus can track .64 cm. radius curves at approximately 25.4 cm. per minute welding speed. An increase in the minimum radius to be tracked also increases permissible welding speed. The direction of feed need be maintained within only 5° tangent to the seam or weld line. The material should be smooth and flat plus or minus .318 cm. from the center of the seam and free from overhead obstructions plus or minus 15°. Thus, with the welding and tracking apparatus suspended from 130 cm. turret or with 122 cm. longitudinal carriage and a 30 cm. transverse servocontrol carriages used, the apparatus can weld around a 15 cm. square box with .64 cm. radius corners.

A moderate amount of smoke from the welding process will not interfere with the effectiveness of the detector. However, inert or process gases commonly used in welding may be fed to an area adjacent the protective tube 98 to flush out any dirt or smoke.

From the foregoing, it should be apparent that the new and unobvious apparatus for positioning and tracking a cavity has been provided.

The present invention may be embodied in other specific forms without departing from the spirit or essential attributes thereof and, accordingly, reference should be made to the appended claims, rather than to the foregoing specification as indicating the scope of the invention.

I claim:

1. Apparatus for positioning a tool element with respect to a cavity, comprising a source of electromagnetic radiation other than said tool element having a high proportion of wavelengths measuring 1 to 10 microns, means for directing electromagnetic radiation developed by said source onto the cavity and the surface area adjacent thereto at locations spaced from the tool element, detection means for sensing electromagnetic radiation reflected from the cavity and the surface area adjacent thereto, scanning means for creating relative movement between said detection means and the electromagnetic radiation incident thereon, said detection means including means for sensing differences between radiation reflected from the cavity and adjacent surfaces and relating such differences as an indication of the position of the detector relative to the cavity, and tool element means positively orientated with respect to said detector.

2. Apparatus for positioning a tool element in accordance with claim 1 including carriage means for shifting the position of the tool element means relative to the cavity.

3. Apparatus in accordance with claim 2 including servo means for shifting the position of the tool element relative to the cavity in response to deviations from a pre-set dimensional relationship between said cavity and said tool element.

4. Apparatus for positioning a tool element with respect to a cavity in accordance with claim 1 wherein said tool element means is welding apparatus and said cavity is a weld seam.

5. Apparatus for positioning a tool element with respect to a cavity in accordance with claim 1 wherein the infrared image of said cavity is scanned across a transducer portion of said detection means.

6. Apparatus for positioning a welding tool with respect to an interstice creating a cavity in which a welding material is to be deposited, comprising a source of electromagnetic radiation other than the welding tool having a high proportion of wavelengths measuring 1 to 10 microns, means for directing electromagnetic radiation developed by said source onto the interstice and the surface area adjacent thereto, detection means sensitive to the electromagnetic radiation reflected from the interstice and the surface area adjacent thereto at locations spaced from the tool element, scanning means for effecting cyclical relative movement between said detection means and the electromagnetic radiation incident thereon, said detection means including means for sensing differences between the radiation reflected from the interstice and the radiation reflected from adjacent surfaces, and means relating such differences to the time base of a scan as an indication of the position of the detection means relative to the interstice, welding apparatus positively orientated with respect to the detection means, said welding apparatus being supported on a movable carriage, and means for shifting the position of said movable carriage.

References Cited

UNITED STATES PATENTS

| | | | |
|---|---|---|---|
| 3,101,618 | 8/1963 | Hance | 318—282 X |
| 3,262,006 | 7/1966 | Sciaky et al. | 219—125 X |
| 3,268,805 | 8/1966 | Normando | 219—125 X |

FOREIGN PATENTS 901,203  7/1962  Great Britain.

JOSEPH V. TRUHE, Primary Examiner

L. A. SCHUTZMAN, Assistant Examiner

U.S. Cl. X.R.

250—83.2, 202; 314—63